(12) United States Patent
Aoki et al.

(10) Patent No.: US 6,989,934 B2
(45) Date of Patent: Jan. 24, 2006

(54) DISPLAY APPARATUS FOR VEHICLE

(75) Inventors: Kunimitsu Aoki, Shizuoka (JP); Go Nakamura, Shizuoka (JP); Ichiro Kataoka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 241 days.

(21) Appl. No.: 10/679,314

(22) Filed: Oct. 7, 2003

(65) Prior Publication Data

US 2004/0113866 A1    Jun. 17, 2004

(30) Foreign Application Priority Data

Oct. 9, 2002   (JP) ............................. 2002-296512

(51) Int. Cl.
  *G02B 27/14* (2006.01)
  *G09G 5/00* (2006.01)
(52) U.S. Cl. ...................... 359/629; 359/630; 359/633; 345/7; 345/8; 353/13
(58) Field of Classification Search ................ 359/629, 359/630, 631, 632, 633; 345/7, 8, 204; 353/13, 353/28
See application file for complete search history.

(56) References Cited

U.S. PATENT DOCUMENTS

| 4,973,139 | A |   | 11/1990 | Weinhrauch et al. |
|---|---|---|---|---|
| 5,007,711 | A | * | 4/1991 | Wood et al. ................... 359/13 |
| 5,414,439 | A |   | 5/1995 | Groves et al. |
| 5,504,622 | A |   | 4/1996 | Oikawa et al. |
| 5,657,163 | A | * | 8/1997 | Wu et al. .................... 359/630 |
| 5,805,119 | A | * | 9/1998 | Erskine et al. ................. 345/7 |
| 6,359,737 | B1 | * | 3/2002 | Stringfellow ................ 359/631 |
| 6,392,812 | B1 | * | 5/2002 | Howard ....................... 359/633 |
| 6,443,573 | B2 | * | 9/2002 | Aoki ............................ 353/13 |
| 6,486,856 | B1 | * | 11/2002 | Zink .............................. 345/7 |
| 6,791,511 | B2 | * | 9/2004 | Eschler et al. .................. 345/8 |
| 6,836,369 | B2 | * | 12/2004 | Fujikawa et al. ........... 359/630 |

FOREIGN PATENT DOCUMENTS

| DE | 101 35 986 A1 | 2/2002 |
|---|---|---|
| EP | 0 202 460 A2 | 11/1986 |
| JP | 7-42854 | 10/1995 |

OTHER PUBLICATIONS

Copy of German Office Action dated Jan. 21, 2005 with translation (5 pages).

* cited by examiner

*Primary Examiner*—Loha Ben
(74) *Attorney, Agent, or Firm*—Armstrong, Kratz, Quintos, Hanson & Brooks, LLP

(57) ABSTRACT

A display apparatus for vehicle that can use a space in an instrument panel effectively, minimize a display distortion and allow a vehicle driver to adjust a position of a visible range in an eye range comprises a display unit; a frame; a case; a supporting axis; and a retractable connecting member. The display unit includes a display device, an optical member for magnifying the image, a reflecting member for reflecting the image disposed in between the display device and the optical member, and a cover. The cover is attached to a frame fixed to an opening of the instrument panel for covering the opening. The display device, the optical member and the reflecting member are accommodated in the case integrally. The case is supported rotatably by the supporting axis inside the instrument panel. The retractable connecting member connects the case to the frame.

10 Claims, 3 Drawing Sheets

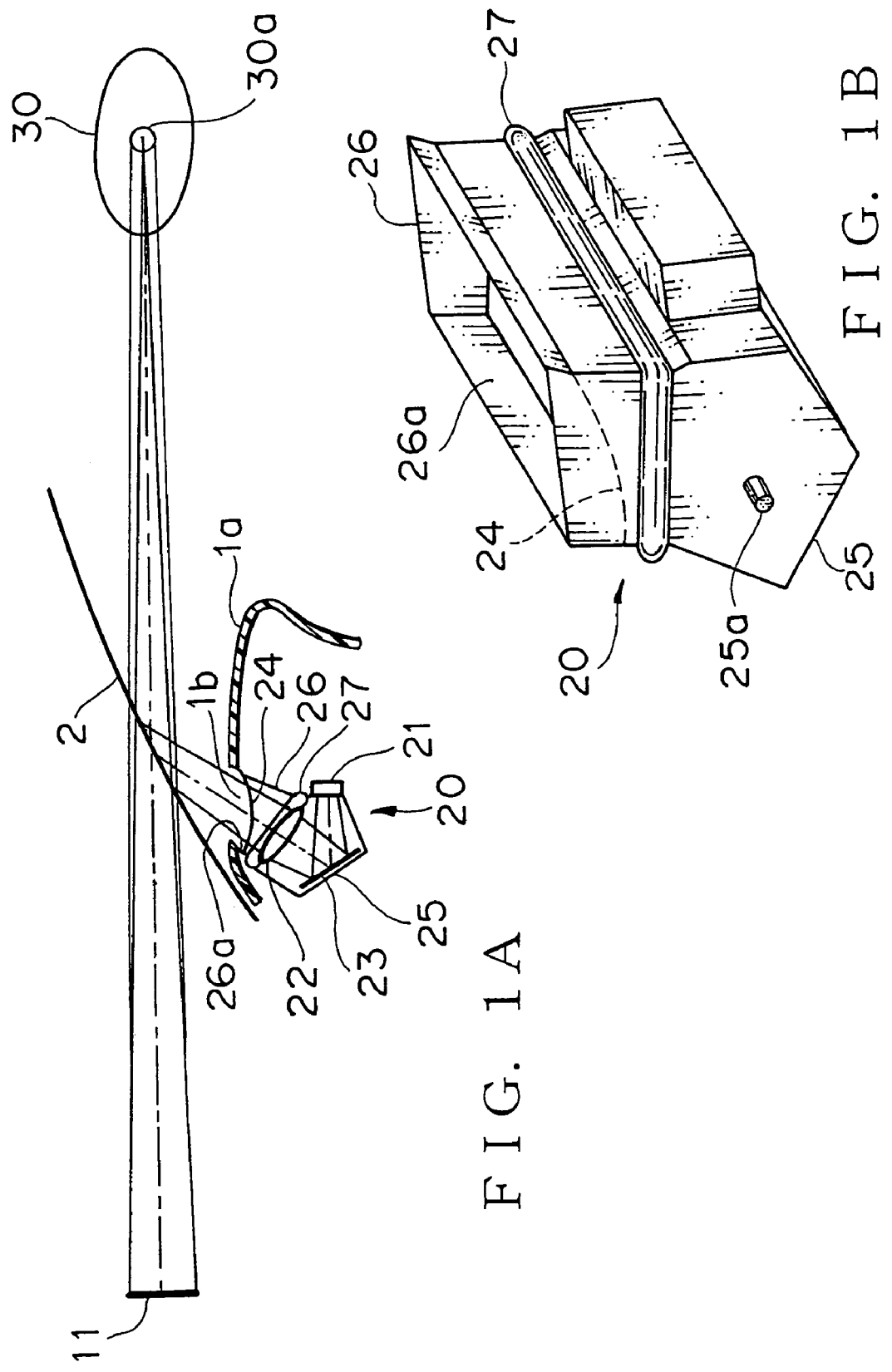

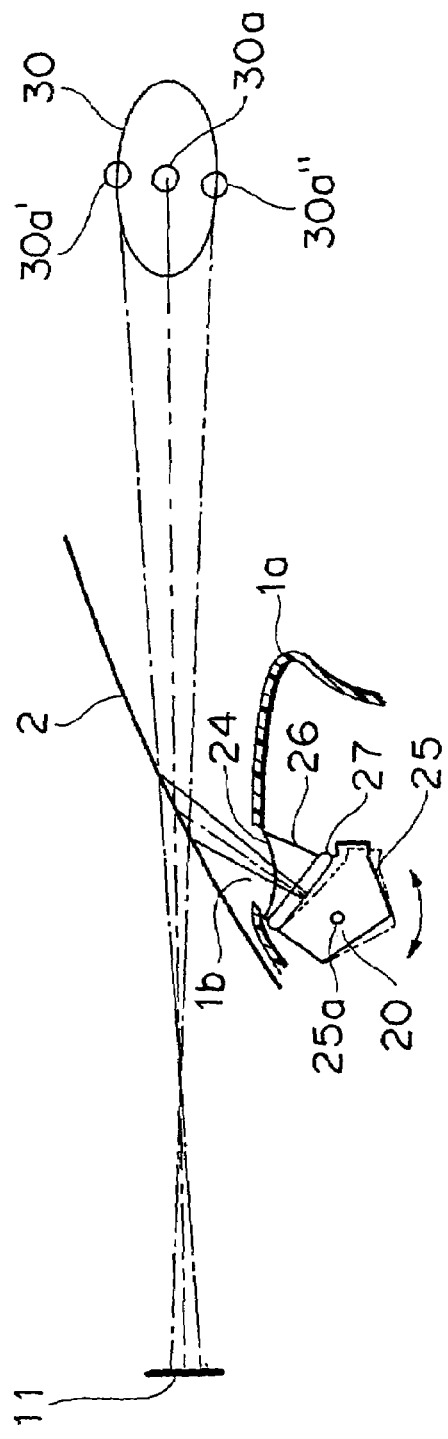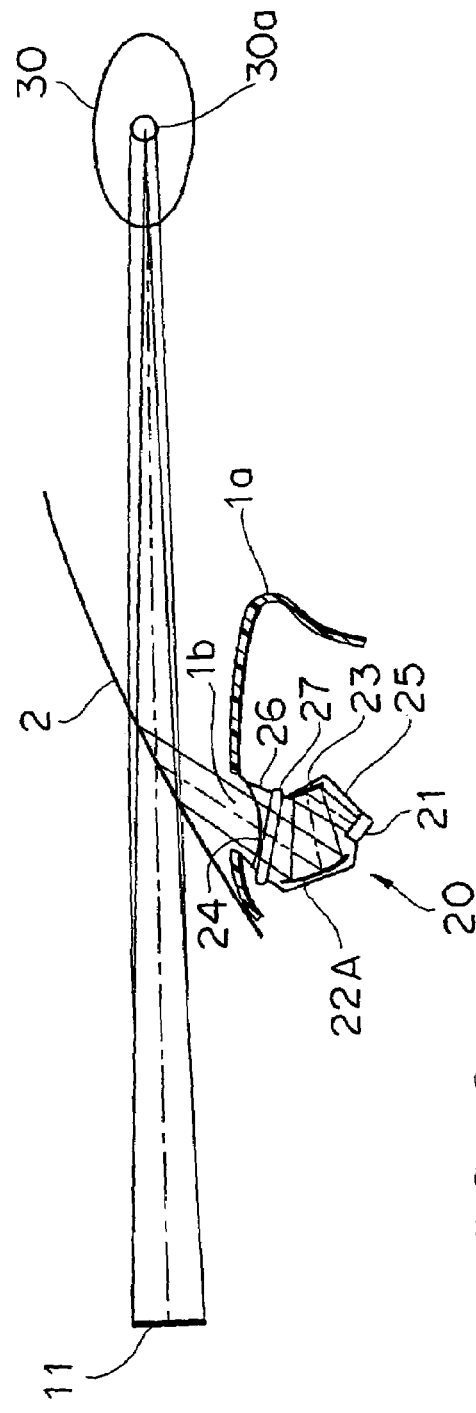

DISPLAY APPARATUS FOR VEHICLE

BACKGROUND OF THE INVENTION

1. Field of the Invention

This invention relates to a display apparatus for vehicle to display speed of vehicle, warning and the like, generally called a head-up display (HUD).

2. Description of the Related Art

Japanese Utility Model Application Laid-Open No. Hei 7-42854 discloses such a display apparatus for vehicle. In this display apparatus as shown in FIG. 5, a projector 13 having a LCD display cell (not shown, hereafter referred to as a display device), a light source, a driving circuit, lens and the like is disposed in an instrument panel 1a of a vehicle 1. A displayed image on the display device of the projector 13 projected onto a windshield 2 is visible to eyes of a vehicle driver by reflecting the image with the windshield 2 toward the driver. A reflecting mirror 14 for compensating distortion which reflects the image of the display device onto an inner surface of the windshield 2 is provided in between the display device of the projector 13 and the windshield 2. This reflecting mirror 14 has reflection characteristics of the inner surface of the windshield 2. According to this structure, the reflected image of the display device distorted by reflection of the inner surface of the windshield 2 turns into an original normal image of the display device, so that the image on the windshield 2 can be very legible without distortion.

However, in the display apparatus for vehicle having above described structure, if a space for installing the projector 13 in the instrument panel 1a is small, there is a case where the reflecting mirror 14 cannot be installed in front of the projector 13.

Preferably, a distance between a displayed virtual image with lens and the driver is long. This is because there is merit that labor for focusing with eyes is reduced when the driver moves his eyes to the displayed virtual image during driving.

A distance between a reflecting point of a last reflecting mirror (windshield 2 in FIG. 5) and the display device corresponds to a distance between the reflecting point and the virtual image. Actually, because the windshield 2 is curved, the image displayed on the windshield 2 is enlarged and seems to be further.

Accordingly, it is necessary to physically dispose the display device away from the windshield 2 so that the distance between the display device and the windshield 2 satisfies the requirement. However, a space inside the instrument panel 1a does not have such a margin.

Therefore, there is a method making a virtual image by the display device and an optical member for magnifying the image such as a lens or a magnifying mirror in a display apparatus for vehicle having the small space inside the instrument panel 1a, whereby the display apparatus for vehicle has a same effect as a display apparatus for vehicle disposing the windshield 2 away from the display device.

Namely, as shown in FIG. 6, a relation between the display device and the optical member for magnifying is:

$$1/a - 1/b = 1/f.$$

A distance (b) between the optical member for magnifying (lens 5) and the virtual image 10 is determined by both a distance (a) between the lens 5 and the display device (display surface 3a of the LCD display cell), and a focus f of a lens 5.

For miniaturizing the display apparatus, by reducing the focus f, the distance (d) is reduced to be able to miniaturize the display apparatus. However, such a display apparatus has a large display distortion and cannot provide a fine visible display.

Therefore, preferably, the display device and the optical member for magnifying are away from each other as far as possible in a given space, and a lens having the minimum magnification is employed as long as satisfying a requirement, so that the display apparatus provides a fine visible display with a minimum display distortion.

Moreover, for preventing the HUD unit from upsizing, there is a case where a certain amount of visible range is provided in an eye range. In this case, it is necessary for shifting the visible range throughout the whole eye range to adjust a position of the visible range in the eye range at the HUD unit side.

SUMMARY OF THE INVENTION

Accordingly, in view of the problems described above, it is an object of this invention to provide a display apparatus for vehicle that can use a space in an instrument panel effectively, minimize a display distortion and allow a vehicle driver to adjust a position of a visible range in an eye range when visually recognizing a displayed image of a display device disposed inside the instrument panel, said image being transmitted through an opening of the instrument panel and reflected by an inner surface of a windshield toward a vehicle driver.

The object of the invention has been achieved by providing a display apparatus for vehicle comprising: a display unit including a display device, an optical member for magnifying a displayed image on the display device, a reflecting member for reflecting the displayed image disposed in between the display device and the optical member, and a cover for covering an opening of an instrument panel of the vehicle; a frame fixed to the opening; a case in which the display device, the optical member and the reflecting member are accommodated integrally; a supporting axis for supporting the case rotatably inside the instrument panel; and a retractable connecting member for connecting the case to the frame, whereby a vehicle driver recognizes visually the displayed image of the display unit in an eye range, said display unit being disposed inside the instrument panel, said displayed image being transmitted through the opening and reflected by an inner surface of a windshield of the vehicle.

According to one aspect of this invention described above, the display apparatus for vehicle can use a space in an instrument panel effectively, minimize a display distortion and allow the vehicle driver to adjust a position of a visible range in the eye range when visually recognizing the displayed image of the display device disposed inside the instrument panel, said image being transmitted through the opening of the instrument panel and reflected by the inner surface of the windshield toward the vehicle driver. Moreover, this display apparatus prevents dust from invading the display unit.

The object of the invention has been also achieved by providing a display apparatus for vehicle comprising: a display unit including a display device, an optical member for magnifying a displayed image on the display device, a reflecting member for reflecting the displayed image disposed in between the display device and the optical member, and a cover for covering an opening of an instrument panel of the vehicle; a frame fixed to the opening; a case in which the display device, the optical member, the reflecting member and the cover are accommodated integrally; a supporting axis for supporting the case rotatably inside the instrument panel; and a retractable connecting member for connecting the case to the frame, whereby a vehicle driver recognizes visually the displayed image of the display unit in an eye range, said display unit being disposed inside the instrument panel, said displayed image being transmitted through the opening and reflected by an inner surface of a windshield of the vehicle.

According to another aspect of this invention described above, the display apparatus for vehicle can use a space in an instrument panel effectively, minimize a display distortion and allow the vehicle driver to adjust a position of a visible range in the eye range when visually recognizing the displayed image of the display device disposed inside the instrument panel, said image being transmitted through the opening of the instrument panel and reflected by the inner surface of the windshield toward the vehicle driver. Moreover, this display apparatus prevents dust from invading the display unit.

Preferably, the reflecting member has complementary reflection characteristics of the inner surface of the windshield for compensating the displayed image distorted by the reflection characteristics of the inner surface of the windshield.

According to this aspect of the invention, the display apparatus can reduce distortion of the displayed image.

Preferably, the reflecting member further has reflection characteristics for compensating another display distortion as a double image caused by both eyes parallax.

According to this aspect of the invention, the display apparatus can reduce distortion of the displayed image further.

Preferably, the optical member is any one of a convex lens, a fresnel lens and a concave mirror.

According to this aspect of the invention, the display apparatus can easily magnify the displayed image of the display device.

Preferably, the cover is formed in a concave shape and attached to the frame where a shield wall of the frame can be seen from the eye range.

According to this aspect of the invention, outside light transmitting through the windshield is not reflected by the cover to go into the driver's eye and to dazzle the driver. Therefore, the display apparatus provides high safety.

BRIEF DESCRIPTION OF THE DRAWINGS

FIG. 1A is a schematic view showing one embodiment of a display apparatus for vehicle according to this invention;

FIG. 1B is a perspective view of a display unit of the one embodiment of the display apparatus for vehicle;

FIG. 2 is a schematic view for explaining how to adjust a position of visible range in eye range in the display apparatus of FIG. 1A;

FIG. 3 is a schematic view showing a variation of an optical member in FIG. 1A;

DESCRIPTION OF THE PREFERRED EMBODIMENT

Figure 4:
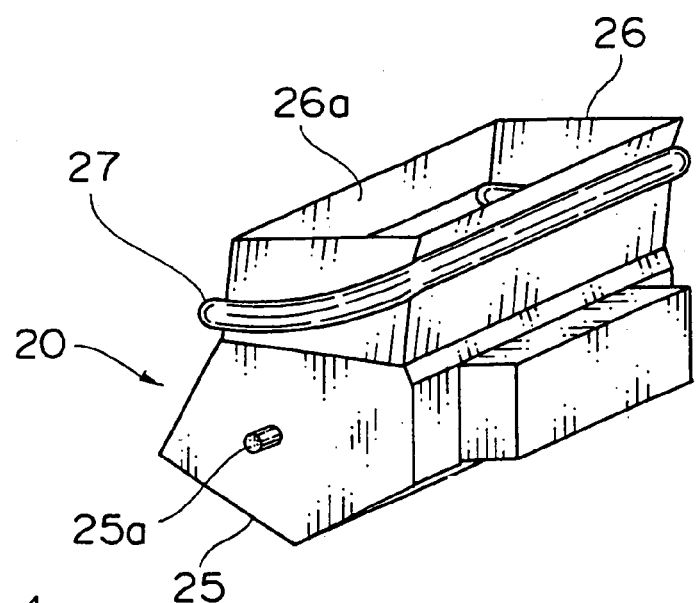
FIG. 4 is a perspective view showing a variation of the display unit in FIG. 1A.
Figure 5:
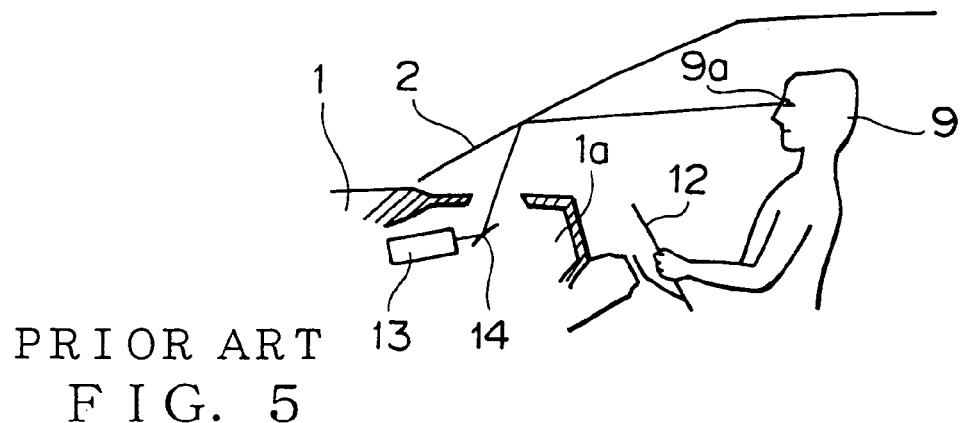
FIG. 5 is a schematic view showing a composition of a conventional display apparatus for vehicle.
Figure 6:
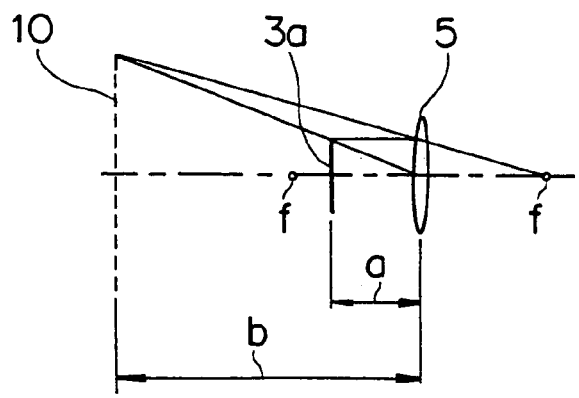
FIG. 6 is a diagram showing a relation between a display device and an optical member for magnifying in the display apparatus for vehicle of FIG. 5.

One embodiment of the present invention will now be described below with reference to figures.

In a display apparatus for vehicle as shown in FIG. 1A, a display unit 20 is provided having a display device 21 made of such as LCD display inside an opening 1b formed on an instrument panel 1a, a convex lens 22 as an optical member for magnifying a displayed image of the display device 21, a reflecting mirror 23 as a reflecting member disposed in between the display device 21 and the convex lens 22 for reflecting the displayed image, and a cover 24 for covering the opening 1b.

The cover 24 is attached to a frame 26. The frame 26 is fixed to the opening 1b by a fixing means such as a screw cramp. The display device 21, the convex lens 22, and the reflecting mirror 23 are accommodated in a case 25 integrally. A retractable connecting member 27 connects the case 25 to the frame 26. A supporting axis 25a is provided at each side surface facing each other of the case 25. One supporting axis 25a at one of the side surfaces is shown in FIG. 1B. The supporting axes 25a attach the case 25 to a suitable place inside the instrument panel 1a rotatably.

For using a given space as effectively as possible, the convex lens 22 and the display device 21 are disposed away from each other as far as possible. The reflecting mirror 23 having complementary reflection characteristics of an inner surface of the windshield 2 is disposed in between the convex lens 22 and the display device 21.

AR (anti-reflective) coating is applied to both front and back surfaces of the convex lens 22 for preventing outside light from being reflected and for increasing efficiency of using light of the display device 21.

The cover 24 is made of a transparent acrylic sheet, transmits a displayed image light from the display device 21, and prevents outside dust from invading the display unit 20. Moreover, since it is dazzling and dangerous for a driver that the outside light is reflected by the cover 24 to the driver's eyes, the cover 24 is so disposed as not to be directly recognized visually from an eye range 30. Namely, for preventing the driver from seeing the cover 24 reflecting the outside light, the cover 24 is formed in a concave shape, and so attached to the frame 26 as to show a shield wall 26a to the driver when seeing from the eye range 30.

The connecting member 27 is made of such as rubber membrane, bellows, and spongy cushion, and connects an upper circumferential part of the case 25 to a lower circumferential part of the frame 26.

In this structure described above, by reflected by a reflecting mirror 23, magnified by the convex lens 22, transmitting through the cover 24, passing through the opening 1b of the instrument panel 1a and finally being reflected by the inner surface of the windshield 2, the light of the displayed image of the display device 21 of the display unit 20 is visually recognized by the driver's eyes (not shown) positioned at a visually recognizing range 30a of an eye range 30.

In this case, since the reflecting mirror 23 has the complementary reflection characteristics of the inner surface of the windshield 2, a virtual image 11, imaged by the displayed image of the display device 21 being reflected by the reflecting mirror 23 and subsequently reflected by the windshield 2, is a normal original displayed image of the display device 21 with a distortion compensation, said distortion being caused by a reflection characteristics of the windshield 2.

Moreover, as shown in FIG. 2, by rotating the case 25 with using the supporting axis 25a of the case 25 as a fulcrum, the displayed image of the display device 21 can be adjusted to be seen as the virtual image 11 imaged at different positions in a front side of the vehicle from visually recognizing range 30a' and 30a" which are different from the original visually recognizing position 30a in the eye range 30 in a vertical direction.

In this case, the frame 26 to which the cover 24 is attached and the case 25 attached to a suitable position rotatably inside the instrument panel 1a by the supporting axis 25a are disposed a length for rotation of the case 25 away from each other. However, since the connecting member 27 being retractable in accordance with the rotation is connecting the case 25 to the frame 26, such as dust is prevented from invading the display unit 20 through the space for the rotation.

Additionally, when a specification requires a large display area, the convex lens 22 becomes large to increase weight and cost, and resultingly the display unit 20 cannot be produced. In this case, the convex lens 22 can be replaced with a fresnel lens.

Further, since an incidence of the light of the displayed image of the display device 21 is basically perpendicular to the convex lens 22, it is hard to generate an optical aberration of the convex lens. However, if the specification requires a large magnification or a large display area, both the display device 21 and the convex lens 22 becomes large, and a peripheral part of the convex lens 22 is used to generate an aberration. In this case, for preventing the aberration of the convex lens 22, the convex lens 22 can be aspherized.

Further, the reflecting mirror 23 having complementary reflection characteristics of the inner surface of the windshield 2 for compensating the displayed image distorted by the reflection characteristics of the inner surface of the windshield 2 can be so composed as to compensate another displaying distortion of the displayed image as a double image distorted by both eyes parallax.

Further, as shown in FIG. 3, the convex lens 22 can be replaced with a concave mirror (spherical mirror) 22A as an optical member for magnifying. In this case, since a distortion is generated by existence of an incident angle and a reflection angle of the concave mirror 22A, an optical member (not shown, for example, aspherical mirror) is needed for compensating the distortion.

In the display unit 20, the display device 21, the convex lens 22, the reflecting mirror 23 and the cover 24 can be accommodated integrally in the case 25, and as shown in FIG. 4, the case 25 can be connected to the frame 26 fixing to the opening 1b by the retractable connecting member 27. Such a structure is allowed when there is some margin for preventing the outside light reflection with the cover 24 initially. Further, by disposing the cover 24 in the case 25 integrally, there is a merit that it is harder for dust to invade the display unit 20 than the display unit of FIG. 1A.

Although this invention has been fully described by way of examples with reference to the accompanying drawings, it is to be noted that various changes and modifications can be made in a scope of this invention.

For example, in the embodiment described above, the cover 24 is in a concave shape, however, the cover 24 can be in a tabular shape and coated on its both surfaces with anti-reflective coating when there is no room in between an upper part inside the instrument panel 1a and the display unit 20.

Further, in the embodiment described above, the case 25 is away from the frame 26, however, in another embodiment of this invention, the display apparatus can be so composed as to prevent the dust and the like from invading by firstly forming the case 25 larger then the frame 26, secondly extending side walls of the frame 26 for covering the case 25, thirdly fitting the case 25 into the side walls, and lastly filling a space between the case 25 and the side walls of the frame 26 with the connecting member 27 such as a spongy cushion member.

What is claimed is:

1. A display apparatus for vehicle comprising:
    a display unit including a display device, an optical member for magnifying a displayed image on the display device, a reflecting member for reflecting the displayed image disposed in between the display device and the optical member, and a cover for covering an opening of an instrument panel of the vehicle;
    a frame fixed to the opening;
    a case in which the display device, the optical member and the reflecting member are accommodated integrally;
    a supporting axis for supporting the case rotatably inside the instrument panel; and
    a retractable connecting member for connecting the case to the frame,
    whereby a vehicle driver recognizes visually the displayed image of the display unit in an eye range, said display unit being disposed inside the instrument panel, said displayed image being transmitted through the opening and reflected by an inner surface of a windshield of the vehicle.

2. The display apparatus for vehicle as claimed in claim 1, wherein said reflecting member has complementary reflection characteristics of the inner surface of the windshield for compensating the displayed image distorted by the reflection characteristics of the inner surface of the windshield.

3. The display apparatus for vehicle as claimed in claim 2, wherein the reflecting member further has reflection characteristics for compensating another displaying distortion of the displayed image as a double image caused by both eyes parallax.

4. The display apparatus for vehicle as claimed in claim 1, wherein the optical member is any one of a convex lens, a fresnel lens, and a concave mirror.

5. The display apparatus for vehicle as claimed in claim 1, wherein the cover is formed in a concave shape and attached to the frame at a position where a shield wall of the frame can be seen from the eye range.

6. A display apparatus for vehicle comprising:
    a display unit including a display device, an optical member for magnifying a displayed image on the display device, a reflecting member for reflecting the displayed image disposed in between the display device and the optical member, and a cover for covering an opening of an instrument panel of the vehicle;
    a frame fixed to the opening;
    a case in which the display device, the optical member, the reflecting member and the cover are accommodated integrally;
    a supporting axis for supporting the case rotatably inside the instrument panel; and
    a retractable connecting member for connecting the case to the frame,
    whereby a vehicle driver recognizes visually the displayed image of the display unit in an eye range, said display unit being disposed inside the instrument panel, said displayed image being transmitted through the opening and reflected by an inner surface of a windshield of the vehicle.

7. The display apparatus for vehicle as claimed in claim 6, wherein said reflecting member has complementary reflection characteristics of the inner surface of the windshield for compensating the displayed image distorted by the reflection characteristics of the inner surface of the windshield.

8. The display apparatus for vehicle as claimed in claim 7, wherein the reflecting member further has reflection characteristics for compensating another displaying distortion of the displayed image as a double image caused by both eyes parallax.

9. The display apparatus for vehicle as claimed in claim 6, wherein the optical member is any one of a convex lens, a fresnel lens, and a concave mirror.

10. The display apparatus for vehicle as claimed in claim 6, wherein the cover is formed in a concave shape and attached to the frame at a position where a shield wall of the frame can be seen from the eye range.

* * * * *